(12) United States Patent
Hayashi

(10) Patent No.: US 7,576,020 B2
(45) Date of Patent: *Aug. 18, 2009

(54) OPTICAL GLASS, PRECISION PRESS-MOLDING PREFORM, PROCESS FOR THE PRODUCTION OF THE PREFORM, OPTICAL ELEMENT AND PROCESS FOR THE PRODUCTION OF THE OPTICAL ELEMENT

(75) Inventor: Kazutaka Hayashi, Akishima (JP)

(73) Assignee: Hoya Corporation, Tokyo (JP)

( * ) Notice: Subject to any disclaimer, the term of this patent is extended or adjusted under 35 U.S.C. 154(b) by 66 days.

This patent is subject to a terminal disclaimer.

(21) Appl. No.: 11/246,952

(22) Filed: Oct. 11, 2005

(65) Prior Publication Data

US 2006/0079389 A1   Apr. 13, 2006

(30) Foreign Application Priority Data

Oct. 12, 2004   (JP) ............................. 2004-297137

(51) Int. Cl.
C03C 3/15 (2006.01)
C03C 3/066 (2006.01)
C03C 3/155 (2006.01)
C03C 3/068 (2006.01)
B32B 17/04 (2006.01)

(52) U.S. Cl. ............................. 501/50; 501/79; 501/78; 501/51; 428/426

(58) Field of Classification Search .................. 501/51, 501/78, 79, 50; 428/426
See application file for complete search history.

(56) References Cited

U.S. PATENT DOCUMENTS

| | | | |
|---|---|---|---|
| 4,144,076 A | 3/1979 | Matsumaru | |
| 6,844,279 B2* | 1/2005 | Hayashi et al. | 501/50 |
| 7,033,966 B2* | 4/2006 | Kobayashi et al. | 501/41 |
| 2003/0125186 A1* | 7/2003 | Hayashi et al. | 501/50 |
| 2005/0049135 A1* | 3/2005 | Hayashi | 501/78 |
| 2005/0113240 A1* | 5/2005 | Hayashi et al. | 501/50 |
| 2006/0194686 A1* | 8/2006 | Kobayashi et al. | 501/50 |
| 2008/0026928 A1 | 1/2008 | Hayashi et al. | |

FOREIGN PATENT DOCUMENTS

| | | | |
|---|---|---|---|
| EP | 1236694 A1 * | 9/2002 | |
| JP | 53-71115 | 6/1978 | |
| JP | 55-116641 | 9/1980 | |
| JP | 62-100449 | 5/1987 | |
| JP | 8-26766 | 1/1996 | |
| JP | 8-59282 | 3/1996 | |
| JP | 2002-12443 | 1/2002 | |
| JP | 2002-201041 | 7/2002 | |
| JP | 2002-249337 | 9/2002 | |
| JP | 2002-362938 | 12/2002 | |
| JP | 2004-161506 | 6/2004 | |
| JP | 2004161506 A * | 6/2004 | |
| JP | 2005-47732 | 2/2005 | |
| WO | WO 2004/087596 A1 | 10/2004 | |

* cited by examiner

Primary Examiner—Karl E Group
Assistant Examiner—Elizabeth A Bolden
(74) Attorney, Agent, or Firm—Nixon & Vanderhye P.C.

(57) ABSTRACT

Provided is an optical glass for precision press-molding is free from degradations in product quality caused by a surface altered layer such as fogging, browning, etc., and a precision press-molding preform and an optical element provided are formed of the above glass. The optical glass is a glass which contains $B_2O_3$, $La_2O_3$ and $ZnO$ and is used as a glass material for precision press-molding, and contains, by mol %, 20 to 60% of $B_2O_3$, 0 to 20% of $SiO_2$, 22 to 42% of $ZnO$, 5 to 24% of $La_2O_3$, 0 to 20% of $Gd_2O_3$, provided that the total content of $La_2O_3$ and $Gd_2O_3$ is 10 to 24%, 0 to 10% of $ZrO_2$, 0 to 10% of $Ta_2O_5$, 0 to 10% of $WO_3$, 0 to 10% of $Nb_2O_5$, 0 to 10% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of $BaO$, 0 to 10% of $Y_2O_3$ and 0 to 10% of $Yb_2O_3$, has an Abbe's number (vd) of 40 or more and is substantially free of lithium.

17 Claims, 1 Drawing Sheet

OPTICAL GLASS, PRECISION PRESS-MOLDING PREFORM, PROCESS FOR THE PRODUCTION OF THE PREFORM, OPTICAL ELEMENT AND PROCESS FOR THE PRODUCTION OF THE OPTICAL ELEMENT

TECHNICAL FIELD

The present invention relates to an optical glass, a precision press-molding preform, a process for the production of the preform, an optical element and a process for the production of the optical element. More specifically, the present invention relates to an optical glass used for precision press-molding and being free from degradations in product quality caused by a surface altered layer such as fogging, browning, etc., a precision press-molding preform formed of the above glass, a process for the production of the preform, an optical element formed of the above glass and a process for the production of the optical element.

TECHNICAL BACKGROUND

In recent years, a precision press-molding process (also called mold optics method) attracts attention as a process in which optical elements such as aspherical lenses, etc., formed of a highly functional glass having high refractivity and low dispersion properties or high refractivity and high dispersion properties, can be stably supplied at a low cost in large quantity.

In the precision press-molding method, an optical glass having the low-temperature softening property of being moldable at a relatively low press temperature is used for decreasing damage of a press mold and a mold release film provided on the molding surface of the press mold and for increasing the lifetime of the press mold that is expensive. Such a glass contains $Li_2O$, which is introduced as a glass component for decreasing the glass transition temperature and sag temperature as is disclosed in JP-A-2002-362938.

Meanwhile, when the above glass is precision press-molded, an altered layer called fogging or browning is liable to be generated on the surface of a precision press-molded product. When such fogging or browning exists on a lens surface, or the like, the product is defective, so that it is required to remove a fogged or browned surface by polishing. However, if it is required to apply polishing to the lens surface, etc., of the precision press-molded product for removing the fogging or browning, no features of the precision press-molding method can be utilized.

DISCLOSURE OF THE INVENTION

Under the circumstances, it is a first object of the present invention to provide a precision press-molding optical glass that is free from a quality degradation caused by the generation of an altered layer such as a fogged layer or browned layer on the surface thereof, a precision press-molding preform formed of the above glass, a process for the production of the preform, an optical element formed of the above glass and a process for the production of the optical element.

Further, it is a second object of the present invention to provide a precision press-molding preform excellent in releasability from a press mold used in precision press-molding, and a process for the production of an optical element from the above preform.

For achieving the above objects, the present inventor has made diligent studies, and as a result the following has been found.

Generally, an optical glass for precision press-molding contains a relatively large amount of $Li_2O$ for decreasing the glass transition temperature thereof as shown in JP-A-2002-362938. When the time period for which the glass is exposed to a press molding temperature or a high-temperature environment before and after press molding is long, surface fogging or browning caused by Li is liable to take place since Li ion has a large diffusion coefficient. When Li ion reacts, on a high-temperature glass surface, with a carbon compound contained in the atmosphere or a carbon-containing film coated on a glass surface as a mold release film, a carbonate of Li is generated. The generation of the carbonate causes a temporary decrease in the Li ion concentration in the vicinity of the glass surface. Since, however, Li ion is easily movable in the glass, Li ion inside the glass moves toward the glass surface so as to make up for the decrease in the Li ion concentration in the vicinity of the glass surface, and the generation of the carbonate comes to proceed on the glass surface.

Having inferred that the thus-generated carbonate causes the fogging or browning on the glass, the present inventor has removed Li as a glass component substantially from a glass for constituting a preform, and has accordingly completed the present invention.

That is, the present invention provides (1) an optical glass which comprises $B_2O_3$, $La_2O_3$ and ZnO and is used as a glass material for precision press-molding, the optical glass comprising, by mol %, 20 to 60% of $B_2O_3$, 0 to 20% of $SiO_2$, 22 to 42% of ZnO, 5 to 24% of $La_2O_3$, 0 to 20% of $Gd_2O_3$, provided that the total content of $La_2O_3$ and $Gd_2O_3$ is 10 to 24%, 0 to 10% of $ZrO_2$, 0 to 10% of $Ta_2O_5$, 0 to 10% of $WO_3$, 0 to 10% of $Nb_2O_5$, 0 to 10% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, having an Abbe's number (vd) of 40 or more and being substantially free of lithium, (2) an optical glass as recited in the above (1), wherein the content of lithium as $Li_2O$ is less than 0.5 mol %, (3) an optical glass as recited in the above (1), which has a refractive index (nd) of 1.79 or more, (4) a precision press-molding preform formed of the optical glass recited in the above (1), (5) a precision press-molding preform as recited in the above (4), which has a surface coated with a carbon-containing film, (6) a precision press-molding preform which is formed of a glass and has a surface coated with a carbon-containing film, said glass having a glass transition temperature (Tg) of 530° C. or higher and being substantially free of lithium, (7) a process for the production of a precision press-molding preform by separating a glass gob from a flowing molten glass and shaping a preform formed of a glass during the cooling of the glass, wherein said glass is an optical glass recited in the above (1), (8) an optical element formed of the optical glass recited in the above (1), (9) a process for the production of an optical element by heating a precision press-molding formed of a glass and precision press-molding the preform with a press mold, wherein the preform recited in any one of the above (4) or (6) is used.

(10) a process for the production of an optical element as recited in the above (9), wherein the precision press-molding is followed by oxidation of a carbon-containing film remaining on the surface of a precision press-molded product to remove the film, and

(11) a process for the production of an optical element, which comprises the steps of heating a precision press-molding preform formed of a glass and precision press-molding the preform with a press mold, wherein said glass is substantially free of lithium; said preform, a precision press-molded product or both of these are heat-treated in an atmosphere containing a carbon compound; and the temperature for said heat treatment is higher than a temperature that is lower than the glass transition temperature (Tg) of said glass by 50° C.

Effect of the Invention

According to the present invention, there can be provided a precision press-molding optical glass free from degradations in product quality caused by a surface altered layer such as fogging, browning, etc.; a precision press-molding preform formed of the above glass; a process for the production of the preform, an optical element formed of the above glass and a process for the production of the optical element.

Further, there can be also provided a precision press-molding preform excellent in releasability from a press mold used in precision press-molding and a process for the production of an optical element from said preform.

PREFERRED EMBODIMENTS OF THE INVENTION

Figure 1:
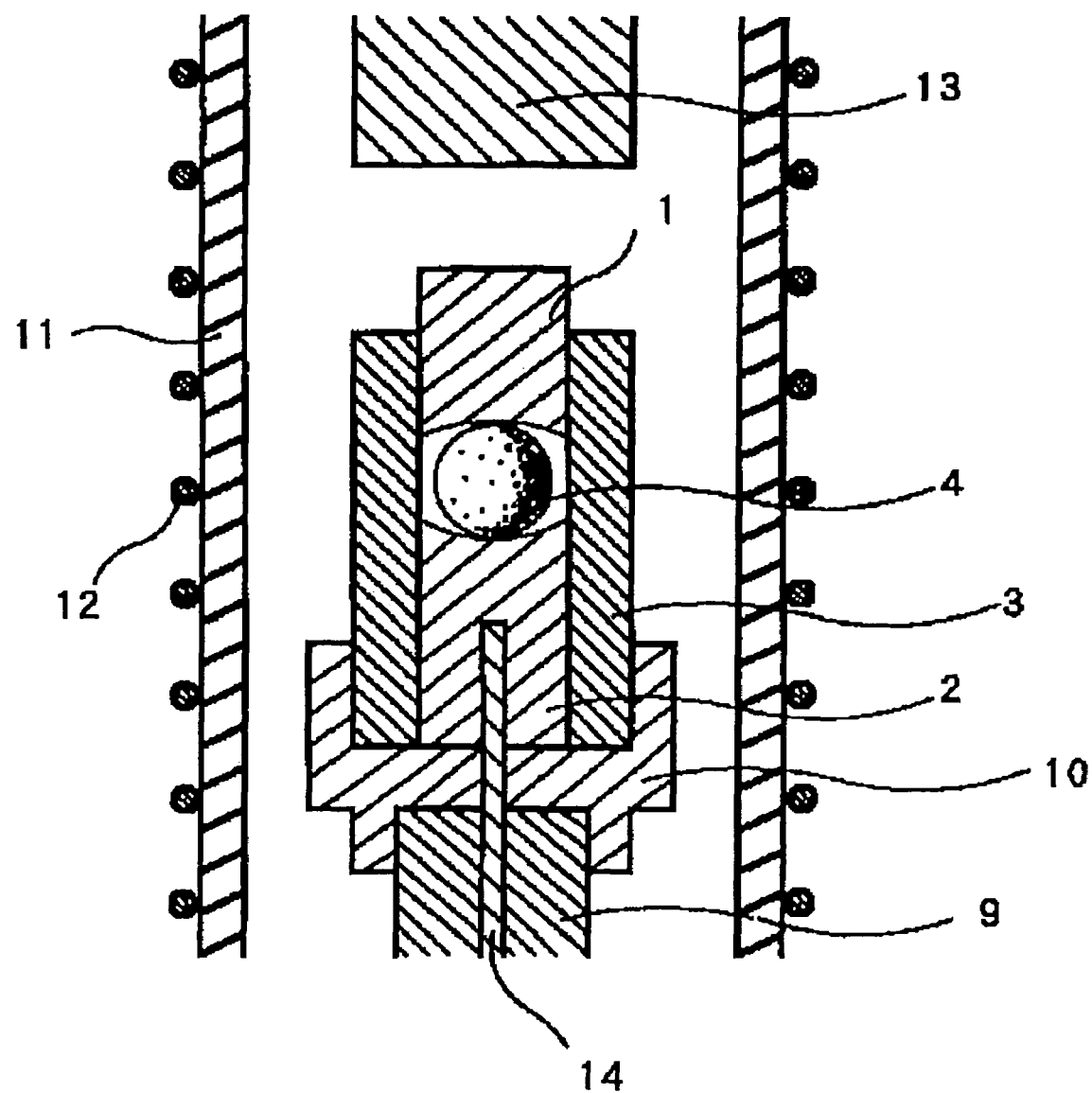
FIG. 1 is a schematic cross-sectional view of one example of a precision press-molding apparatus used in Examples and Comparative Examples.

Preferred embodiments of the present invention will be explained in the order of the optical glass, the precision press-molding preform and the process for the production thereof, and the optical element and the process for the production thereof.

[Optical Glass]

The optical glass of the present invention is an optical glass which comprises $B_2O_3$, $La_2O_3$ and ZnO and is used as a glass material for precision press-molding, the optical glass comprising, by mol %, 20 to 60% of $B_2O_3$, 0 to 20% of $SiO_2$, 22 to 42% of ZnO, 5 to 24% of $La_2O_3$, 0 to 20% of $Gd_2O_3$, provided that the total content of $La_2O_3$ and $Gd_2O_3$ is 10 to 24%, 0 to 10% of $ZrO_2$, 0 to 10% of $Ta_2O_5$, 0 to 10% of $WO_3$, 0 to 10% of $Nb_2O_5$, 0 to 10% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, having an Abbe's number (vd) of 40 or more and being substantially free of lithium.

The above limitation of "being substantially free of lithium" means that the introduction of $Li_2O$ is controlled such that the content of $Li_2O$ is at a level at which none of fogging and browning to impair its use for an optical element is generated on the glass surface. Specifically, it means that the content of lithium as $Li_2O$ is limited to less than 0.5 mol %. The risk of generation of fogging and browning can be decreased by decreasing the lithium content, so that the content of lithium as $Li_2O$ is preferably limited to 0.4 mol % or less, more preferably, to 0.1 mol % or less. Still more preferably, no lithium is introduced.

The functions of the above components will be explained below. Contents (%) of the above components and total contents (%) of some of the components hereinafter represent mol % unless otherwise specified, and ratios of contents of components hereinafter represent molar ratios.

$B_2O_3$ is an essential component and works as an oxide for forming a glass network. When a high refractivity component such as $La_2O_3$, etc., is introduced in a large amount, it is required to introduce at least 20% of $B_2O_3$ as a main network-constituting component for forming the glass, so that the stability against devitrification is fully imparted and that the meltability of the glass is maintained. However, when over 60% of $B_2O_3$ is introduced, the refractive index of the glass is decreased, which is no longer suitable for the object to obtain a high-refractivity glass. The content of $B_2O_3$ is therefore limited to 20 to 60%. For improving the above effect produced by the introduction of $B_2O_3$, the content of $B_2O_3$ is preferably 22 to 58%, more preferably 24 to 56%.

$SiO_2$ is an optional component, and it works to decrease the liquidus temperature of a glass having a large content of $La_2O_3$ or $Gd_2O_3$, works to improve the glass in high-temperature viscosity and further works to improve the glass in stability to a great extent. When $SiO_2$ is introduced to excess, however, not only the refractive index of the glass is decreased, but also the glass transition temperature is increased, and it is hence difficult to carry out precision press-molding. The content of $SiO_2$ is therefore limited to 0 to 20%, preferably, to 0 to 18%.

ZnO is an essential component, and it works to decrease the melting temperature, liquidus temperature and transition temperature of the glass and is indispensable for adjusting the refractive index of the glass. Since the glass of the present invention is substantially free of $Li_2O$, it is required to introduce a large amount of ZnO as compared with a glass containing $Li_2O$. On the other hand, when over 42% of ZnO is introduced, the dispersion is increased, the stability against devitrification is degraded, and the chemical durability of the glass is also degraded, so that the content of ZnO is limited to 22 to 42%, preferably, to 23 to 41%.

$La_2O_3$ is an essential component as well. It increases the refractive index and improves the chemical durability without decreasing the stability of the glass against devitrification or increasing the dispersion. When the content of $La_2O_3$ is less than 5%, no sufficient effects can be obtained. When it exceeds 24%, the stability against devitrification is extremely degraded. The content of $La_2O_3$ is therefore limited to 5 to 24%. For improving the above effects more, the content of $La_2O_3$ is preferably limited to 6 to 23%, more preferably, to 7 to 22%.

Like $La_2O_3$, $Gd_2O_3$ is a component that improves the glass in refractive index and chemical durability without degrading the stability of the glass against devitrification and the low-dispersion property. When the content of $Gd_2O_3$ exceeds 20%, the stability against devitrification is degraded, and the glass transition temperature is liable to increase to degrade precision press-moldability. The content of $Gd_2O_3$ is therefore limited to 0 to 20%. For improving the chemical durability while imparting the glass with high refractivity, it is preferred to introduce 1 to 19% of $Gd_2O_3$. More preferably, the content of $Gd_2O_3$ is in the range of 2 to 18%. For improving the glass stability, the glass preferably has a composition having a co-presence of $La_2O_3$ and $Gd_2O_3$. Particularly, when a precision press-molding preform is produced from a molten glass by shaping a glass during the cooling of the glass as will be described later, it is important to improve the glass stability more as described above for preventing the devitrification of the glass in the shaping step.

In addition, for obtaining a glass having an Abbe's number (vd) of 40 or more and having a higher refractive index, it is advantageous to adjust the total content of $La_2O_3$ and $Gd_2O_3$ to 10 to 24%, preferably, to 12 to 23%.

$ZrO_2$ is an optional component used as a high-refractivity low-dispersion component. When $ZrO_2$ is introduced, there can be produced an effect that the glass is improved in high-temperature viscosity and stability against devitrification without decreasing the refractive index of the glass. However, when the content of $ZrO_2$ exceeds 10%, the liquidus temperature is sharply increased, and the stability against devitrification is degraded. The content of $ZrO_2$ is therefore limited to 0 to 10%, preferably, to 0 to 8%.

$Ta_2O_5$ is an optional component used as a high-refractivity and low-dispersion component. When a small amount of $Ta_2O_5$ is introduced, there is produced an effect that the glass is improved in high-temperature viscosity and stability against devitrification without decreasing the refractive index of the glass. However, when the content of $Ta_2O_5$ exceeds 10%, the liquidus temperature is sharply increased, and the dispersion is increased. The content of $Ta_2O_5$ is therefore limited to 0 to 10%, preferably, to 0 to 8%.

$WO_3$ is a component that is introduced as required for improving the glass in stability and meltability and improving the glass in refractivity. When the content of $WO_3$ exceeds 10%, the dispersion is increased, and the necessary low-dispersion property can be no longer obtained. The content of $WO_3$ is therefore limited to 0 to 10%, preferably, to 0 to 8%.

$Nb_2O_5$ is an optional component for increasing the refractive index while maintaining the stability of the glass. When it is introduced to excess, the dispersion is increased. The content of $Nb_2O_5$ is therefore limited to 0 to 10%, preferably, to 0 to 8%.

$TiO_2$ is an optional component that can be introduced for adjusting optical constants. However, when it is introduced to excess, the dispersion is increased, and no intended optical constants can be obtained. The content of $TiO_2$ is therefore limited to 0 to 10%, preferably, to 0 to 8%. More preferably, no $TiO_2$ is introduced.

$Bi_2O_3$ works to increase the refractive index and works to improve the glass stability. When it is introduced to excess, the glass stability is degraded, and the liquidus temperature is increased. The content of $Bi_2O_3$ is therefore limited to 0 to 10%, preferably, to 0 to 6%.

$GeO_2$ is an optional component that not only works to increase the refractive index but also works to improve the glass stability. The content of $GeO_2$ is adjusted to 0 to 10%, preferably, to 0 to 8%. Since, however, $GeO_2$ is widely differently expensive as compared with any other component, it is more preferred not to introduce $GeO_2$.

$Ga_2O_3$ is also an optional component that not only works to increase the refractive index but also works to improve the glass stability. The content of $GeO_2$ is adjusted to 0 to 10%, preferably, to 0 to 8%. Since, however, $Ga_2O_3$ is widely differently expensive as compared with any other component, it is more preferred not to introduce $Ga_2O_3$.

$Al_2O_3$ works not only to increase the high-temperature viscosity of the glass but also to decrease the liquidus temperature, and also works to improve the glass in moldability. It further works to improve the glass in chemical durability. However, when $Al_2O_3$ is introduced to excess, the refractive index is decreased, and the stability against devitrification is decreased. The content of $Al_2O_3$ is therefore limited to 0 to 10%, preferably, to 0 to 8%.

BaO is an optional component used as a high-refractivity and low-dispersion component. When a small amount of BaO is introduced, the glass is improved in stability and improved in chemical durability. When the content of BaO exceeds 10%, the stability of the glass against devitrification is impaired to a great extent, and the glass transition temperature and sag temperature are increased. The content of BaO is therefore limited to 0 to 10%, preferably, to 0 to 8%.

$Y_2O_3$ and $Yb_2O_3$ are optional components used as high-refractivity and low-dispersion components. When a small amount of $Y_2O_3$ or $Yb_2O_3$ is introduced, the glass is improved in stability and improved in chemical durability. When they are introduced to excess, the stability of the glass against devitrification is impaired to a great extent, and the glass transition temperature and sag temperature are increased. Therefore, the content of $Y_2O_3$ is limited to 0 to 10%, preferably, to 0 to 8%, and the content of $Yb_2O_3$ is limited to 0 to 10%, preferably, to 0 to 8%.

In addition, it is preferred to adjust the total content of $La_2O_3$, $Gd_2O_3$, $Y_2O_3$ and $Yb_2O_3$ to 10 to 24%.

Besides these, $Sb_2O_3$ may be added as a refining agent as required. When the amount of $Sb_2O_3$ (that is not any "glass component") based on the total content of the entire glass components exceeds 1% by weight, the molding surface of a press mold may be damaged during precision press-molding. It is therefore preferred to limit the amount of $Sb_2O_3$ based on the total content of the entire glass component to 0 to 1% by weight, more preferably, to 0 to 0.5% by weight.

Meanwhile, PbO is one that is undesirable as a glass component to add. PbO is harmful, and further, when a preform formed of a glass containing PbO is precision press-molded in a non-oxidizing atmosphere, there is caused a problem that lead is deposited on the surface of a molded product to impair the transparency of the molded product as an optical element, or that metal lead deposited adheres to a press mold.

$Lu_2O_3$ is a glass component that is generally not so frequently used as any other glass component, and it has high rarity value and is expensive as a raw material for an optical glass, so that it is preferred in view of a cost not to introduce $Lu_2O_3$. An optical glass having the above glass composition can materialize preforms suitable for precision press-molding even without containing $Lu_2O_3$.

Desirably, the optical glass of the present invention contains none of environmentally detrimental elements such as cadmium, tellurium, etc., radioactive elements such as thorium, etc., and harmful elements such as arsenic, etc. Desirably, further, the optical glass of the present invention does not contain fluorine in view of volatilization during melting.

The optical properties of the optical glass of the present invention will be explained below. First, the Abbe's number (vd) is at least 40 as described above. For imparting the glass with remarkably excellent stability suitable for molding a preform, preferably, the upper limit of the Abbe's number (vd) is 50. Further, the optical glass of the present invention preferably has a high-refractivity property or a refractive index (nd) of 1.79 or more. When a glass is taken as a material for an optical element, increasing the refractive index of the glass implies broadening of freedom degree of the glass. While increasing the refractive index is preferred from the viewpoint of the broadening of the above freedom degree, if the refractive index is increased with maintaining the dispersion, there is generated a tendency to a decrease in glass stability. It is therefore required to take account of the dispersion for increasing the refractive index with maintaining the glass stability. When the above point is taken into consideration, the optical glass of the present invention can be said to be superior as an optical glass that satisfies the properties represented by the following expressions (1) and (2).

$$vd \geq -125 \times nd + 268.75 \ (40 \leq vd \leq 45) \qquad (1)$$

$$nd \geq 1.79 \ (45 \leq vd \leq 50) \qquad (2)$$

The optical glass of the present invention more preferably exhibits the optical properties in the ranges represented by the above expressions (1) and (2).

The upper limit of the refractive index (nd) is not specially limited, and the refractive index (nd) can be increased so long as the object of the present invention can be achieved. For imparting the glass with excellent stability, however, the refractive index (nd) is 1.90 or less.

The above glass transition temperature (Tg) will be explained below. The optical glass of the present invention is supplied for precision press-molding. For preventing abrasion of a press mold and damage of a mold release film provided on the molding surface of the above mold, therefore, a low glass transition temperature (Tg) is preferred, and the glass transition temperature (Tg) is preferably 630° C. or lower, more preferably 620° C. or lower. On the other hand, the lithium content in the glass is limited as explained above for preventing fogging and browning on the glass surface, so that, if attempts are made to decrease the glass transition temperature (Tg) to excess, there is liable to be caused a problem that the refractive index is decreased or that the glass stability is degraded. Therefore, the glass transition temperature (Tg) is preferably 530° C. or higher, more preferably 540° C. or higher.

The above optical glass can be obtained by weighing and preparing oxides, carbonates, sulfates, hydroxides, etc., so as to obtain an intended glass composition, fully mixing them to prepare a mixed batch, heating, melting, defoaming and stirring the batch to prepare a homogeneous molten glass free of bubbles in a melting vessel, and shaping the molten glass. Specifically, the optical glass can be obtained by a known melting method.

(Precision Press-Molding Preform and Process for the Production Thereof)

The precision press-molding preform (to be sometimes simply referred to as "preform" hereinafter) of the present invention will be explained below. The preform of the present invention means a preliminary glass shaped material to be heated and supplied for precision press-molding. The precision press-molding is also called mold optics method as is well known and refers to a method in which the optical-function surface of an optical element is formed by transfer of the form of molding surface of a press mold. The optical-function surface refers to that surface of an optical element which refracts, reflects, diffracts or transmits light as an object to be controlled, and the lens surface of a lens, or the like corresponds to the above optical-function surface.

The preform of the present invention includes two embodiments.

The first embodiment (to be referred to as "preform I" hereinafter) is formed of the above optical glass of the present invention.

The preform I preferably has a surface coated with a carbon-containing film. Desirably, the carbon-containing film contains carbon as a main component (when element contents in the film are represented by atomic %, the content of carbon is greater than the content of any other element). Specific examples of the carbon-containing film include a carbon film, a hydrocarbon film, and the like. The carbon-containing film coated on the preform surface can prevent the adhesion of a glass and a mold surface during precision press-molding. Further, the carbon-containing film can also improve the function of fully spreading the glass in a cavity constituted by a mold during precision press-molding. From the above viewpoint, a graphite-like carbon film is a preferred example as a carbon-containing film. The method for forming the carbon-containing film can be selected from known methods using a carbon material such as a vacuum vapor deposition method, a sputtering method, an ion plating method, etc., or known methods such as pyrolysis using a feed gas of a hydrocarbon.

The present inventor has found that while exhibiting the above excellent functions during precision press-molding, the carbon-containing film is one of factors that cause fogging or browning on the glass surface. That is, the fogging or browning is caused by a carbonate that is generated on the glass surface due to a reaction between Li ion in the glass and carbon in the film under high temperature conditions. In the preform I, the surface thereof is enriched with carbon. However, Li in the glass which is the other factor to generate the carbonate is suppressed or precluded, so that the fogging and browning can be prevented.

The second embodiment (to be referred to as "preform II" hereinafter) is a precision press-molding preform formed of a glass having a surface coated with a carbon-containing film, in which the above glass has a glass transition temperature (Tg) of 530° C. or higher and is substantially free of Li.

In the preform II, the carbon-containing film coating the surface is the same as the carbon-containing film explained with regard to the preform I. Further, the phrase of "being substantially free of Li" has the same meaning as that explained with regard to the optical glass of the present invention.

The preform II is constituted of a glass having a relatively high glass transition temperature (Tg) of 530° C. or higher as compared with a glass for use in precision press-molding. When the glass transition temperature is high, the temperature for precision press-molding and the strain point of the glass are also high. As is well known, the strain point can be an index for a temperature for treatment to decrease a strain in the glass. Therefore, the preform II can be placed under a relatively high temperature in the way of a press molding temperature in a state where the carbon-containing film is present on its surface, and after its precision press-molding, the preform II can be annealed at a relatively high temperature similarly in a state where the carbon-containing film is present on its surface. With an increase in the press molding temperature or the annealing temperature, the reaction between Li ion in the glass and carbon in the film on the glass surface is more promoted. In the preform II, the lithium content in the glass is suppressed as described above, so that, even if the glass surface is enriched with carbon, the preform II can provide an optical element free of fogging and browning by precision press-molding and following heat treatment.

The above explanation of the preform II can apply to the preform I formed of the optical glass of the present invention having a surface coated with the carbon-containing film and having a glass transition temperature (Tg) of 530° C. or higher.

The above carbonate is generated on the glass surface not only by a reaction between carbon present in the film on the glass surface and Li ion in the glass but also by bringing a preform or precision press-molded product formed of a glass containing Li ion into a high-temperature state in a carbon-containing atmosphere. For example, a carbonate can be generated when the preform is heated in a carbon-containing atmosphere during the formation of a film on the preform surface or when a precision press-molded product is annealed in a carbon-containing atmosphere, for example, in ambient atmosphere. Both of the preforms I and II can overcome the above fogging and browning problems since the glasses constituting the preforms I and II are substantially free of Li.

In the preform I, the mold release film for coating the preform I is not limited to film mainly composed of carbon. For example, there can be employed a method in which the preform I is brought into contact with a liquid or gas raw material prepared from an organic material to coat the preform surface with a self-assembled monolayer film.

The glass for constituting the preform II preferably comprises $B_2O_3$, $La_2O_3$ and ZnO as glass components, and more preferably comprises $B_2O_3$, $La_2O_3$, ZnO and $Gd_2O_3$ as glass components. Concerning the contents of $B_2O_3$, $La_2O_3$, ZnO and $Gd_2O_3$, preferably, the content of $B_2O_3$ is 25 to 60 mol %, the content of $La_2O_3$ is 5 to 24 mol %, the content of $Gd_2O_3$ is 0 to 20 mol %, and the content of ZnO is 22 to 42 mol %. When the glass stability is particularly taken into account, desirably, the content of $La_2O_3$ is 7 to 22 mol %, the content of $Gd_2O_3$ is 2 to 18 mol %, and the content of ZnO is 23 to 41 mol %. The above composition is preferred as a composition that can materialize a high-refractivity low-dispersion glass having a refractive index (nd) of 1.75 or more and an Abbe's number (vd) of 30 or more. Particularly preferably, the above composition has those optical properties which are explained with regard to the optical glass of the present invention. The glass constituting the preform II still more preferably has glass compositions explained with regard to the embodiments of the optical glass of the present invention.

The process for the production of the preforms I and II will be explained below.

The process for the production of a preform, provided by the present invention, is a process for the production of a precision press-molding preform formed of a glass, which comprises separating a flowing molten glass and shaping the molten glass into a preform during the cooling of the glass, wherein the above glass is the optical glass of the present invention. This process of the production is suitable for producing the preforms I and II.

The process for the production of a glass preform, provided by the present invention, will be explained below. This production process comprises separating a molten glass gob having a predetermined weight from a molten glass and cooling the glass gob to obtain a precision press-molding preform having the same weight as that of the above molten glass gob.

Specifically, a fully melted, refined and homogenized molten glass is prepared, and the molten glass is caused to flow out of a flow nozzle or pipe that is temperature-adjusted, to produce the above preform.

The method of the temperature adjustment includes a method in which the temperature of the flow nozzle or pipe is controlled. The material for the flow nozzle or pipe is desirably platinum or a platinum alloy. Specific examples of the production process include (a) a process which comprises causing a molten glass drop having a predetermined weight to fall from the flow nozzle and receiving the drop with a receiving member to produce a glass preform, (b) a process which comprises causing a molten glass drop having a predetermined weight to fall similarly from the above flow nozzle into liquid nitrogen, to produce a preform, and (c) a process which comprises causing a molten glass flow to flow down from a flow pipe formed of platinum or a platinum alloy, receiving the forward end of the molten glass flow with a receiving member, forming a narrow portion between the nozzle side and the receiving member side of the molten glass flow, then separating a molten glass flow at the narrow portion and receiving a molten glass gob having a predetermined weight with the receiving member and shaping the glass gob into a glass preform.

For producing a preform having a smooth surface free of scratches, soiling, surface alteration, etc., for example, a free surface, there is employed a method in which a molten glass gob is shaped into a preform while applying a gas pressure to the molten glass gob on/over a shaping mold, or a method in which a molten glass drop is caused to drop into a medium prepared by liquefying a substance, which is a gas under atmospheric pressure at room temperature such as nitrogen, by cooling to shape the drop into a preform.

When the molten glass gob is shaped into a preform while causing the molten glass gob to float, a gas (floating gas) is blown to the molten glass gob to apply an upward gas pressure thereto. In this case, when the viscosity of the molten glass gob is too low, floating gas is blown into the glass to remain in the form of bubbles in the preform. However, when the viscosity of the molten glass gob is adjusted to 3 to 60 dPa·s, the glass gob can be caused to float without blowing any floating gas into the glass.

The gas used as a floating gas to cause the glass gob (preform) to float includes air, $N_2$ gas, $O_2$ gas, Ar gas, He gas, water vapor, and the like. The gas pressure is not specially limited so long as the glass gob can float without contacting any solid such as the surface of the shaping mold, or the like.

In the process for the production of a preform, provided by the present invention, the weight of the preform is determined to be accurately in agreement with the weight of the molten glass gob. Various types of precision press-molded products are obtained by precision press-molding preforms of the present invention. When the weight of a precision press-molded product as an end product is taken as a standard, and when the weight of a preform is by far smaller than the weight of an intended precision press-molded product, the glass is not fully filled in the molding surface of a press mold during the precision press-molding, and there is caused a problem that no intended surface accuracy can be obtained or that the thickness of the precision press-molded product comes to be smaller than a predetermined thickness. Further, when the weight of the preform is too large, there is caused a problem that superfluous glass enters gaps of press mold members to form burrs or that the thickness of a molded product comes to be larger than a predetermined thickness. It is therefore required to control the weight of the above preform more precisely than it is required to control the weight of any preform for general press molding, and for this reason, the weight of the preform and the weight of the molten glass gob are determined to be accurately in agreement with each other.

In the above manner, there can be obtained a preform whose entire surface is formed by solidification of a glass in a molten state, a preform whose entire surface is formed by solidification of a glass in a molten state and is not processed with a machine, and a preform whose entire surface is formed of a free surface. Since such preforms are formed, a smooth surface (free of any grinding mark or polishing mark) can be obtained. The above preforms are preferred as a preform of the present invention. The above "free surface" refers to a surface formed without contacting any solid so that no surface of the solid is transferred thereto in the step of cooling a glass in a molten or softened state. Specifically, a glass in a molten or softened state is cooled while it is caused to float by applying a gas pressure, whereby there can be produced a preform whose entire surface is formed by solidification of a glass in a molten state or a preform whose entire surface is a free surface.

Many precision press-molded products (optical elements) produced from preforms of the present invention have rotational symmetry axes like a lens, so that the preform of the present invention desirably has a form having a rotational symmetry axis. Specific examples of the preform include a preform having the form of a sphere and a preform having a form having one rotational symmetry axis. The form having one rotational symmetry axis includes a form having a smooth contour free of a corner and a dent in a cross section including the above rotational symmetry axis, such as a form whose contour is an ellipse whose minor axis is aligned with the rotational symmetry axis in the above cross section. There can be the form of a flattened sphere (a form obtained by determining one axis passing the center of a sphere and decreasing the dimensions of the sphere in the above axis direction).

While the above process for the production of a preform, provided by the present invention, is suitable for producing the preform I and the preform II, the process for the production of the preform I or the preform II shall not be limited to the above process. For example, a refined and homogenized molten glass is cast into a mold, then, a shaped glass material is annealed to remove its strain and divided into predetermined dimensions and forms by a cutting or splitting method or the like, and the surface of each divided product is smoothened by polishing, whereby preforms having a predetermined weight each can be obtained. In addition, the surface of the preform II is coated with a carbon-containing film.

(Process for the Production of an Optical Element)

The optical element of the present invention has a characteristic feature that it is formed of the above optical glass of the present invention. Specific examples of the optical element include lenses such as an aspherical lens, a spherical lens, a plano-convex lens, a plano-concave lens, a biconvex lens, a biconcave lens, a convex meniscus lens, a concave meniscus lens, etc., a microlens, a lens array, a lens with a diffraction grating, a prism, a prism with a lens function, and the like. The surface of the optical element may be provided with an anti-reflection film, a partial reflection film having selectivity to wavelength, or the like as required.

According to the optical element of the present invention, there can be provided a high-quality optical element having a surface free of fogging and browning, and there can be particularly provided an optical element having high-refractivity low-dispersion properties and having an excellent surface state, by precision press-molding.

The process for the production of an optical element, provided by the present invention, includes two embodiments.

The first embodiment (to be referred to as "optical element production process I" hereinafter) is a process for the production of an optical element, which comprises heating a precision press-molding preform formed of a glass and precision press-molding the preform with a press mold, wherein the above preform I or II is used. In the optical element production process I, the glass constituting the preform is substantially free of Li, so that the fogging or browning generated on the glass surface by a reaction between carbon outside the glass and Li ion inside the glass can be prevented, and an optical element having an excellent surface state can be produced by precision press-molding. Particularly, even when a carbon-containing film is present on the preform surface, there is formed no carbonate that causes the fogging or browning, so that the releasability from a mold in the precision press-molding can be improved by coating a carbon-containing film, and the extension of glass can be improved during its press molding.

The precision press-molding and the heating of a preform to be supplied for precision press-molding are preferably carried out in an atmosphere of a non-oxidizing gas such as nitrogen gas or a mixture gas of nitrogen gas with hydrogen gas for preventing oxidation of the molding surface of a press mold or a mold release film provided on the above molding surface. In the non-oxidizing atmosphere, the carbon-containing film coating the preform is not oxidized and remains on the surface of a precision press-molded product. The above film is to be finally removed. For relatively easily and completely removing the carbon-containing film, the precision press-molded product can be heated in an oxidizing atmosphere, for example, in ambient atmosphere. According to the present invention, the glass constituting the precision press-molded product is substantially free of Li, and there is therefore no case where carbon in the carbon-containing film or carbon dioxide in ambient atmosphere reacts with Li ion in the glass to generate a carbonate on the glass surface, so that the carbon-containing film can be removed with preventing the fogging and browning.

The removal of the carbon-containing film by oxidation is to be carried out at or under a temperature at which the precision press-molded product undergoes no deformation under heat. Specifically, it is preferably carried out in a temperature range below the transition temperature of the glass.

The second embodiment (to be referred to as "optical element production process 2" hereinafter) is a process for the production of an optical element, which comprises the steps of heating a precision press-molding preform formed of a glass and precision press-molding the preform with a press mold to produce a precision press-molded product, wherein the above glass is substantially free of lithium; the above preform, the precision press-molded product or both are heat-treated in an atmosphere containing a carbon compound; and the temperature for the above heat treatment is higher than a temperature that is lower than the glass transition temperature (Tg) of the above glass by 50° C.

The optical element production process 2 is mainly a process for preventing the fogging and browning from being generated on the glass surface by carbon present in an atmosphere when the preform and the precision press-molded product are heat-treated.

Specifically, when a precision press-molded product is annealed in an atmosphere containing a carbon compound such as carbon dioxide to remove a strain, or when a preform is heated in an atmosphere containing a carbon compound for forming a carbon-containing film on the preform surface, a carbonate is formed on the surface of a glass containing Li to cause fogging or browning if the treatment temperature for the annealing or the film formation is higher than a temperature that is lower than the glass transition temperature (Tg) by 50° C. (if the treatment temperature is higher than (Tg −50° C.)). It is thinkable to decrease the heat treatment temperature in order to suppress the carbonate formation. However, the time period required for the heat treatment and the heat treatment temperature approximately have the relationship represented by the following expression (3) (in which A and B represent constants), and the time period required for the heat treatment is hence increased to a great extent if the heat treatment temperature is decreased, so that it is difficult to carry out practical heat treatment.

$$\text{Time period required for heat treatment} = B \times \exp(-A/\text{heat treatment temperature}) \quad (3)$$

According to the present invention, however, Li in the glass is another cause to form the carbonate, and Li is controlled or removed, whereby fogging or browning on the glass surface can be prevented while the heat treatment can be carried out for a time period suitable for practice. In the optical element production process 2, the preform used is preferably the above preform I or II.

In the precision press-molding, there is used a press mold whose molding surface is highly precisely processed to have a predetermined form, and a mold release film may be formed on the molding surface for preventing the adhesion of the glass thereto during pressing. The mold release film includes a carbon-containing film, a nitride film and a noble metal film, and the carbon-containing film preferably includes a hydrogenated carbon film, a carbon film, and the like. In the precision press-molding, a preform is supplied between a pair of opposed upper and lower mold members of which the molding surface form(s) is precisely processed, then, both the mold and the preform are heated and temperature-increased up to a temperature at which the optical glass had a viscosity of $10^5$ to $10^9$ dPa·s, to soften the preform, and the preform is press-molded, whereby the form(s) of the molding surface(s) of the press mold can be transferred to the preform.

Alternatively, a glass preform which is pre-heated to a temperature at which the glass had a viscosity of $10^4$ to $10^8$ dPa·s is supplied between a pair of opposed upper and lower mold members of which the molding surface form(s) is precisely processed, and the preform is press-molded, whereby the form(s) of the molding surface(s) of the press mold can be transferred to the preform.

As an atmosphere during the molding, it is preferred to employ a non-oxidizing atmosphere for protecting mold release films provided on the molding surface(s) and the preform surface. The non-oxidizing atmosphere can be selected from inert gases such as argon, nitrogen, etc., reducing gas such as hydrogen or a mixture gas of an inert gas and a reducing gas, and it is preferred to use nitrogen gas or a mixture of a small amount of hydrogen gas with nitrogen gas. The pressure and time period for the pressing can be determined as required by taking account of the viscosity of the optical glass, etc., and the pressing can be carried out, for example, under a pressure of approximately 5 to 15 MPa for a pressing time period of 10 to 300 seconds. Press conditions such as the pressing time period, the pressing pressure, etc., can be determined in well known ranges as required depending upon the form and dimensions of a molded product.

Thereafter, the mold and the glass molded product are cooled, and preferably, when the temperature reaches a strain point or lower, the mold members are separated and the glass molded product is taken out. For bringing the optical properties precisely into agreement with predetermined values, the annealing conditions such as an annealing rate, etc., during the cooling may be adjusted as required.

EXAMPLES

The present invention will be more specifically explained with reference to Examples hereinafter. The present invention shall not be limited by these Examples.

Optical glasses were measured for properties by the following methods.

(1) Refractive Index (nd) and Abbe's Number (vd)

An optical glass obtained by holding at a temperature between its glass transition temperature (Tg) and its sag temperature (Ts) and temperature-decreasing at a temperature decrease rate of −30° C./hour was measured for a refractive index (nd) and an Abbe's number (vd) (with "GMR-1" supplied by Shimadzu Device Corporation) according to the refractive index measurement method of Japan Optical Glass Industrial Society Standard.

(2) Glass Transition Temperature (Tg) and Sag Temperature (Ts)

A sample was measured with a thermo-mechanical analyzer "TMA8510" supplied by Rigaku Corporation at a temperature elevation rate of 4° C./minute under a load of 98 mN.

Examples 1-51

Oxides, carbonates, sulfates, nitrates, hydroxides, etc., as raw materials for introducing components of a glass, such as $H_3BO_3$, $La_2O_3$, ZnO, $ZnCO_3$, $Gd_2O_3$, $ZrO_2$, etc., were weighed so as to obtain a composition having a predetermined weight of 250 to 300 g as shown in Tables 1 and 2 and fully mixed to obtain a prepared batch, and the batch was placed in a platinum crucible and melted in an electric furnace held at 1,200 to 1,450° C. with stirring in air for 2 to 4 hours. After melted, a molten glass was cast into a 40×70×15 mm mold made from carbon and allowed to cool to its glass transition temperature. Immediately thereafter, the glass was placed in an annealing furnace and annealed in a glass transition temperature range for approximately 1 hour. In the furnace, then, the glass was allowed to cool to room temperature, to give an optical glass. No crystal observable through a microscope was precipitated in the thus-obtained optical glasses.

Tables 3 and 4 show properties of optical glasses obtained in the above manner.

Then, the glass was temperature-increased up to a temperature corresponding approximately to a press-molding temperature under conditions where carbon was present outside the glass, thereby to create an environment in precision press-molding, and the glass was tested for a change on the glass surface. In this test, 51 samples having free surfaces and having glass compositions corresponding to the above glasses were prepared first, and the samples were placed in stainless steel vessel together with a compound that was to generate carbon dioxide by decomposition under heat. In this state, the samples were heated to a temperature that was 10° C. lower than glass transition temperatures, maintained for 3 hours, then cooled to room temperature and taken out of the stainless steel vessel. The surfaces of the samples were observed visually, and enlarged and observed through an optical microscope. As a result, fogging was not found on any one of the samples, and when enlarged and observed through the optical microscope, the samples showed smooth surfaces.

Comparative Example 1

An optical glass having a glass composition containing $Li_2O$ shown in Table 2 was prepared in the same manner as in Examples 1 to 51. Table 4 shows the properties of the optical glass.

Then, a sample having a glass composition corresponding to the above glass was prepared, and the sample was tested for a change on the glass surface in the same manner as in Examples 1 to 51. As a result, fogging was found when the sample was visually observed, and when the sample was enlarged and observed through an optical microscope, it was found that a particulate products were generated all over the surface of the sample.

TABLE 1

| Ex. | $B_2O_3$ | $SiO_2$ | ZnO | $Li_2O$ | $La_2O_3$ | $Gd_2O_3$ | La + Gd | $ZrO_2$ | $Ta_2O_5$ | $WO_3$ | $Nb_2O_5$ | BaO | $GeO_2$ | Total |
|---|---|---|---|---|---|---|---|---|---|---|---|---|---|---|
| 1 | 35.94 | 3.13 | 34.38 | 0.00 | 11.72 | 5.47 | 17.19 | 4.69 | 3.13 | 1.56 | 0.00 | 0.00 | 0.00 | 100.00 |
| 2 | 34.35 | 6.11 | 38.17 | 0.00 | 11.45 | 3.82 | 15.27 | 3.05 | 3.05 | 0.00 | 0.00 | 0.00 | 0.00 | 100.00 |
| 3 | 31.34 | 5.97 | 41.79 | 0.00 | 11.19 | 3.73 | 14.93 | 2.99 | 2.99 | 0.00 | 0.00 | 0.00 | 0.00 | 100.00 |
| 4 | 42.62 | 3.28 | 26.23 | 0.00 | 12.30 | 5.74 | 18.03 | 3.28 | 3.28 | 3.28 | 0.00 | 0.00 | 0.00 | 100.00 |
| 5 | 39.52 | 3.23 | 29.03 | 0.00 | 12.50 | 6.05 | 18.55 | 3.23 | 3.23 | 3.23 | 0.00 | 0.00 | 0.00 | 100.00 |
| 6 | 40.98 | 3.28 | 26.23 | 0.00 | 13.11 | 6.56 | 19.67 | 3.28 | 3.28 | 3.28 | 0.00 | 0.00 | 0.00 | 100.00 |
| 7 | 41.15 | 3.29 | 26.34 | 0.00 | 13.58 | 7.00 | 20.58 | 2.47 | 2.88 | 3.29 | 0.00 | 0.00 | 0.00 | 100.00 |
| 8 | 37.50 | 0.00 | 35.94 | 0.00 | 11.72 | 3.91 | 15.63 | 3.13 | 3.13 | 4.69 | 0.00 | 0.00 | 0.00 | 100.00 |
| 9 | 36.72 | 0.00 | 35.94 | 0.00 | 12.50 | 3.91 | 16.41 | 3.59 | 3.13 | 4.22 | 0.00 | 0.00 | 0.00 | 100.00 |
| 10 | 37.94 | 0.00 | 33.99 | 0.00 | 13.04 | 3.95 | 17.00 | 3.16 | 3.16 | 4.74 | 0.00 | 0.00 | 0.00 | 100.00 |
| 11 | 37.80 | 0.00 | 34.65 | 0.00 | 11.81 | 4.72 | 16.54 | 3.15 | 3.15 | 4.72 | 0.00 | 0.00 | 0.00 | 100.00 |
| 12 | 37.80 | 0.00 | 34.65 | 0.00 | 10.24 | 6.30 | 16.54 | 3.15 | 3.15 | 4.72 | 0.00 | 0.00 | 0.00 | 100.00 |
| 13 | 38.40 | 0.00 | 35.20 | 0.00 | 12.00 | 4.80 | 16.80 | 1.60 | 4.80 | 3.20 | 0.00 | 0.00 | 0.00 | 100.00 |
| 14 | 37.13 | 0.00 | 33.90 | 0.00 | 11.56 | 4.62 | 16.18 | 5.08 | 0.77 | 6.93 | 0.00 | 0.00 | 0.00 | 100.00 |
| 15 | 37.80 | 0.00 | 31.50 | 0.00 | 11.81 | 4.72 | 16.54 | 3.15 | 3.15 | 4.72 | 0.00 | 3.15 | 0.00 | 100.00 |
| 16 | 38.10 | 0.00 | 34.92 | 0.00 | 12.70 | 4.76 | 17.46 | 1.59 | 3.17 | 4.76 | 0.00 | 0.00 | 0.00 | 100.00 |
| 17 | 38.10 | 0.00 | 36.51 | 0.00 | 11.51 | 4.37 | 15.87 | 3.17 | 3.17 | 1.59 | 1.59 | 0.00 | 0.00 | 100.00 |
| 18 | 40.00 | 0.00 | 32.00 | 0.00 | 12.00 | 4.80 | 16.80 | 4.00 | 1.60 | 4.00 | 1.60 | 0.00 | 0.00 | 100.00 |
| 19 | 33.69 | 4.62 | 33.85 | 0.00 | 12.00 | 5.08 | 17.08 | 3.08 | 3.08 | 4.62 | 0.00 | 0.00 | 0.00 | 100.00 |
| 20 | 32.48 | 4.54 | 36.49 | 0.00 | 11.36 | 4.54 | 15.90 | 3.03 | 3.03 | 4.54 | 0.00 | 0.00 | 0.00 | 100.00 |
| 21 | 29.15 | 7.38 | 37.64 | 0.00 | 11.07 | 4.43 | 15.50 | 3.69 | 2.95 | 3.69 | 0.00 | 0.00 | 0.00 | 100.00 |
| 22 | 33.85 | 4.62 | 33.85 | 0.00 | 12.00 | 4.92 | 16.92 | 3.08 | 3.08 | 4.62 | 0.00 | 0.00 | 0.00 | 100.00 |
| 23 | 37.06 | 3.17 | 30.16 | 0.00 | 12.82 | 5.67 | 18.49 | 3.17 | 3.17 | 4.76 | 0.00 | 0.00 | 0.00 | 100.00 |
| 24 | 33.11 | 3.03 | 38.64 | 0.00 | 11.10 | 4.28 | 15.38 | 3.03 | 3.03 | 3.79 | 0.00 | 0.00 | 0.00 | 100.00 |
| 25 | 36.95 | 3.14 | 30.82 | 0.00 | 12.11 | 5.03 | 17.14 | 3.14 | 3.14 | 5.66 | 0.00 | 0.00 | 0.00 | 100.00 |

(Notes)
Ex. = Example,
La + Gd represents a total content of $La_2O_3$ and $Gd_2O_3$.

TABLE 2

| Ex. | $B_2O_3$ | $SiO_2$ | ZnO | $Li_2O$ | $La_2O_3$ | $Gd_2O_3$ | La + Gd | $ZrO_2$ | $Ta_2O_5$ | $WO_3$ | $Nb_2O_5$ | BaO | $GeO_2$ | Total |
|---|---|---|---|---|---|---|---|---|---|---|---|---|---|---|
| 26 | 32.93 | 6.10 | 33.54 | 0.00 | 11.74 | 4.88 | 16.62 | 3.05 | 3.20 | 4.57 | 0.00 | 0.00 | 0.00 | 100.00 |
| 27 | 34.83 | 6.19 | 30.34 | 0.00 | 11.92 | 4.95 | 16.87 | 3.10 | 3.10 | 5.57 | 0.00 | 0.00 | 0.00 | 100.00 |
| 28 | 35.77 | 4.67 | 31.10 | 0.00 | 11.82 | 4.82 | 16.64 | 3.11 | 3.11 | 5.60 | 0.00 | 0.00 | 0.00 | 100.00 |
| 29 | 36.95 | 3.14 | 31.60 | 0.00 | 12.11 | 5.03 | 17.14 | 3.14 | 3.14 | 4.87 | 0.00 | 0.00 | 0.00 | 100.00 |
| 30 | 36.41 | 3.92 | 31.17 | 0.00 | 12.06 | 5.01 | 17.07 | 3.13 | 3.13 | 5.17 | 0.00 | 0.00 | 0.00 | 100.00 |
| 31 | 35.88 | 4.68 | 30.89 | 0.00 | 12.01 | 4.99 | 17.00 | 3.12 | 3.12 | 5.30 | 0.00 | 0.00 | 0.00 | 100.00 |
| 32 | 35.35 | 5.44 | 30.46 | 0.00 | 11.97 | 4.97 | 16.94 | 3.89 | 3.11 | 4.82 | 0.00 | 0.00 | 0.00 | 100.00 |
| 33 | 35.49 | 5.46 | 30.58 | 0.00 | 12.01 | 4.99 | 17.00 | 3.12 | 3.51 | 4.84 | 0.00 | 0.00 | 0.00 | 100.00 |
| 34 | 34.25 | 5.38 | 32.41 | 0.00 | 11.60 | 4.69 | 16.28 | 3.84 | 3.07 | 4.76 | 0.00 | 0.00 | 0.00 | 100.00 |
| 35 | 35.88 | 4.68 | 30.97 | 0.00 | 12.01 | 4.99 | 17.00 | 4.29 | 3.12 | 4.06 | 0.00 | 0.00 | 0.00 | 100.00 |
| 36 | 36.19 | 4.30 | 31.06 | 0.00 | 12.05 | 5.01 | 17.06 | 3.76 | 3.25 | 4.38 | 0.00 | 0.00 | 0.00 | 100.00 |
| 37 | 36.09 | 4.29 | 30.98 | 0.00 | 12.02 | 4.99 | 17.01 | 3.82 | 2.97 | 4.84 | 0.00 | 0.00 | 0.00 | 100.00 |
| 38 | 32.27 | 5.32 | 29.76 | 0.00 | 11.69 | 4.86 | 16.55 | 3.80 | 3.04 | 4.71 | 0.00 | 0.00 | 4.56 | 100.00 |
| 39 | 31.52 | 10.89 | 24.90 | 0.00 | 13.23 | 7.00 | 20.23 | 3.89 | 3.89 | 4.67 | 0.00 | 0.00 | 0.00 | 100.00 |
| 40 | 31.03 | 10.73 | 26.05 | 0.00 | 18.39 | 0.00 | 18.39 | 5.36 | 3.83 | 4.60 | 0.00 | 0.00 | 0.00 | 100.00 |
| 41 | 31.03 | 10.73 | 26.05 | 0.00 | 15.33 | 3.07 | 18.39 | 6.13 | 3.83 | 3.83 | 0.00 | 0.00 | 0.00 | 100.00 |
| 42 | 38.46 | 4.86 | 22.67 | 0.00 | 19.43 | 0.00 | 19.43 | 4.86 | 4.05 | 5.67 | 0.00 | 0.00 | 0.00 | 100.00 |
| 43 | 30.59 | 9.41 | 25.10 | 0.00 | 11.37 | 11.37 | 22.75 | 3.92 | 3.53 | 4.71 | 0.00 | 0.00 | 0.00 | 100.00 |
| 44 | 28.57 | 9.27 | 29.34 | 0.00 | 11.20 | 11.20 | 22.39 | 3.86 | 3.47 | 3.09 | 0.00 | 0.00 | 0.00 | 100.00 |
| 45 | 33.43 | 7.79 | 27.28 | 0.00 | 14.81 | 3.98 | 18.79 | 4.68 | 4.60 | 3.43 | 0.00 | 0.00 | 0.00 | 100.00 |
| 46 | 34.18 | 6.36 | 28.14 | 0.00 | 14.63 | 4.05 | 18.68 | 4.45 | 4.69 | 3.50 | 0.00 | 0.00 | 0.00 | 100.00 |
| 47 | 36.13 | 4.03 | 28.55 | 0.00 | 14.35 | 4.11 | 18.46 | 4.52 | 4.76 | 3.55 | 0.00 | 0.00 | 0.00 | 100.00 |
| 48 | 36.54 | 6.43 | 24.10 | 0.00 | 16.06 | 3.21 | 19.27 | 4.82 | 4.82 | 4.02 | 0.00 | 0.00 | 0.00 | 100.00 |
| 49 | 42.26 | 1.67 | 21.76 | 0.00 | 16.74 | 3.35 | 20.09 | 5.02 | 5.02 | 4.18 | 0.00 | 0.00 | 0.00 | 100.00 |
| 50 | 31.83 | 7.80 | 28.08 | 0.00 | 14.82 | 5.46 | 20.28 | 4.68 | 3.90 | 3.43 | 0.00 | 0.00 | 0.00 | 100.00 |
| 51 | 31.61 | 7.84 | 27.45 | 0.00 | 14.12 | 6.27 | 20.39 | 4.71 | 4.86 | 3.14 | 0.00 | 0.00 | 0.00 | 100.00 |
| CEx. 1 | 34.65 | 9.45 | 29.92 | 3.94 | 11.80 | 3.94 | 15.74 | 3.15 | 3.15 | 0.00 | 0.00 | 0.00 | 0.00 | 100.00 |

(Notes)
Ex. = Example,
CEx. = Comparative Example,
La + Gd represents a total content of $La_2O_3$ and $Gd_2O_3$.

TABLE 3

| Example | Refractive index (nd) | Abbe's number (vd) | Glass transition temperature Tg (° C.) | Sag temperature Ts (° C.) |
|---|---|---|---|---|
| 1 | 1.8313 | 42.1 | 587 | 629 |
| 2 | 1.8098 | 43.6 | 579 | 623 |
| 3 | 1.8172 | 42.9 | 570 | 615 |
| 4 | 1.8177 | 42.6 | 604 | 645 |
| 5 | 1.8281 | 41.9 | 596 | 640 |
| 6 | 1.8281 | 42.3 | 603 | 646 |
| 7 | 1.8266 | 42.6 | 602 | 646 |
| 8 | 1.8365 | 40.1 | 577 | 618 |
| 9 | 1.8424 | 40.1 | 578 | 617 |
| 10 | 1.8413 | 40.1 | 581 | 622 |
| 11 | 1.8395 | 40.1 | 579 | 620 |
| 12 | 1.8383 | 40.2 | 581 | 622 |
| 13 | 1.8398 | 40.4 | 582 | 623 |
| 14 | 1.8373 | 40.0 | 576 | 617 |
| 15 | 1.8360 | 40.4 | 581 | 622 |
| 16 | 1.8377 | 40.3 | 579 | 620 |
| 17 | 1.8393 | 40.2 | 578 | 620 |
| 18 | 1.8371 | 40.2 | 581 | 623 |
| 19 | 1.8412 | 40.1 | 588 | 631 |
| 20 | 1.8392 | 40.0 | 581 | 623 |
| 21 | 1.8401 | 40.2 | 583 | 627 |
| 22 | 1.8399 | 40.2 | 590 | 630 |
| 23 | 1.8412 | 40.6 | 595 | 636 |
| 24 | 1.8365 | 40.3 | 578 | 621 |
| 25 | 1.8392 | 40.0 | 590 | 635 |
| 26 | 1.8385 | 40.1 | 589 | 633 |
| 27 | 1.8353 | 40.1 | 594 | 637 |
| 28 | 1.8355 | 40.1 | 592 | 635 |
| 29 | 1.8361 | 40.5 | 589 | 632 |
| 30 | 1.8363 | 40.4 | 590 | 633 |
| 31 | 1.8358 | 40.3 | 593 | 637 |
| 32 | 1.8372 | 40.5 | 594 | 637 |
| 33 | 1.8359 | 40.4 | 594 | 638 |
| 34 | 1.8364 | 40.2 | 590 | 635 |
| 35 | 1.8350 | 40.9 | 594 | 637 |
| 36 | 1.8357 | 40.6 | 594 | 637 |
| 37 | 1.8356 | 40.5 | 592 | 635 |
| 38 | 1.8380 | 40.0 | 598 | 642 |

TABLE 4

| Example | Refractive index (nd) | Abbe's number (vd) | Glass transition temperature Tg (° C.) | Sag temperature Ts (° C.) |
|---|---|---|---|---|
| 39 | 1.8500 | 40.2 | 619 | 667 |
| 40 | 1.8526 | 40.0 | 607 | 652 |
| 41 | 1.8511 | 40.4 | 609 | 657 |
| 42 | 1.8503 | 40.1 | 610 | 655 |
| 43 | 1.8631 | 40.1 | 625 | 673 |
| 44 | 1.8638 | 40.5 | 622 | 666 |
| 45 | 1.8515 | 40.2 | 608 | 655 |
| 46 | 1.8517 | 40.2 | 604 | 650 |
| 47 | 1.8517 | 40.1 | 602 | 647 |
| 48 | 1.8511 | 40.2 | 609 | 655 |
| 49 | 1.8516 | 40.4 | 614 | 657 |
| 50 | 1.8581 | 40.3 | 608 | 654 |
| 51 | 1.8624 | 40.1 | 612 | 661 |
| CEx. 1 | 1.7981 | 44.7 | 556 | 602 |

CEx. = Comparative Example

Example 52

Preforms were prepared from the glasses of Examples 1 to 51 in the following manner.

First, a molten glass maintained at 1,050 to 1,450° C. in an electric furnace (corresponding to a glass viscosity of 4 to 0.5 dPa·s) was caused to flow down continuously at a constant rate from a pipe formed of a platinum alloy which was temperature-adjusted to 1,050° C. (corresponding to a glass viscosity of 4 dPa·s), the forward end of the molten glass flow was received with a glass preform shaping mold, and the shaping mold was caused to move down at a rate sufficiently greater than the flow-down rate of the molten glass flow at a time when a molten glass gob having a predetermined with was separated from the above forward end, to separate the molten glass gob. The molten glass had a glass viscosity of 7 dPa·s when it was caused to fall down.

The separated molten glass gob was shaped into a glass preform while it was caused to flow by applying an air pressure thereto on/above the above shaping mold, and the glass preform was annealed. The weight of the glass preform was determined in the range of 0.01 to 5 g, and the weight of the molten glass gob and the weight of the preform were in agreement in each case. Further, glass preforms obtained in the above manner had a weight accuracy of within ±1%.

The entire surface of each of the thus-prepared glass preforms was formed by solidification of the corresponding molten glass and was a free surface. Further, none of striae, devitrification, breaking, bubbles, etc., was found on the glass surfaces and inside the glasses.

Example 53

As shown in FIG. 1, each glass preform prepared in Example 52 was separately placed between an upper mold member 1 and a lower mold member 2 which were formed of SiC and had molding surfaces provided with a carbon-containing film (diamond-like carbon film) each, then, a nitrogen atmosphere was introduced into a quartz tube 11, and a heater 12 was electrically powered to heat the inside of the quartz tube 11. The temperature inside the mold was adjusted to a temperature at which the glass preform 4 to be molded came to have a viscosity of approximately $10^5$ to $10^9$ dPa·s, and while this temperature was maintained, a pressing rod 13 was caused to move down to press the upper mold member 1 from above, whereby the glass preform 4 to be molded in the mold was pressed. The pressing was carried out at 5 to 15 MPa for a pressing time period of 10 to 300 seconds. After the pressing, the pressing pressure was removed, a glass molded product obtained by aspherical press molding was gradually cooled to its glass transition temperature while it was kept in contact with the upper mold member 1 and the lower mold member 2, then, the glass molded product was rapidly cooled, and the aspherical glass molded product was taken out of the mold. In FIG. 1, reference numeral 3 indicates a sleeve member, numeral 10 indicates a support bed, numeral 9 indicates a support rod and numeral 14 indicates a thermocouple.

Precision press-molded products obtained in the above manner were annealed in atmosphere at 560° C. for 3 hours, to give aspherical lenses. When the surfaces of the obtained lenses were visually observed, no fogging was found on the surfaces, and when enlarged and observed through an optical microscope, the surfaces were found to be smooth. The refractive index (nd) and Abbe's number (vd) of each of the above lenses were in agreement of the values of the corresponding optical glass constituting the corresponding glass preform.

While the aspherical lenses were prepared in this Example, various optical elements such as a spherical lenses, a microlens, a lens array, a diffraction grating, a lens with a diffraction grating, a prism, a prism with lens functions, etc., can be produced by selecting the forms and dimensions of a press mold as required. An optical multi-layered film such as an anti-reflection film, or the like, may be formed on each surface of these various optical elements.

Comparative Example 2

A spherical lens was prepared from the same glass as that used in Comparative Example 1 according to the same steps as those in the above Example 52 under the same conditions as those in the above Example 52. When the surface of the obtained lens was visually observed, fogging was found, and when the surface was enlarged and observed through an optical microscope, it was found that particulate products were generated all over the surfaces.

INDUSTRIAL UTILITY

The optical glass of the present invention is an optical glass for precision press-molding which is free from degradations in product quality caused by a surface altered layer such as fogging, browning, etc., and is suitably used for producing optical elements excellent in quality through precision press-molding preforms.

The invention claimed is:

1. An optical glass which comprises $B_2O_3$, $La_2O_3$ and ZnO and is used as a glass material for precision press-molding, the optical glass comprising, by mol %, 20 to 60% of $B_2O_3$, 0 to 20% of $SiO_2$, 22 to 42% of ZnO, 5 to 23% of $La_2O_3$, 1 to 19% of $Gd_2O_3$, provided that the total content of $La_2O_3$ and $Gd_2O_3$ is 10 to 24%, 0 to 10% of $ZrO_2$, 0 to 10% of $Ta_2O_5$, 0 to 10% of $WO_3$, 0 to 10% of $Nb_2O_5$, 0 to 10% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, having an Abbe's number (vd) of 40 or more but less than 45, a refractive index (nd) of 1.8098 or more and being substantially free of lithium.

2. The optical glass of claim 1, wherein the content of lithium as $Li_2O$ is less than 0.5 mol %.

3. A precision press-molding preform formed of the optical glass recited in claim 1.

4. The precision press-molding preform of claim 3, which has a surface coated with a carbon-containing film.

5. A precision press-molding preform which is formed of a glass and has a surface coated with a carbon-containing film, said glass having a glass transition temperature (Tg) of 530° C. or higher and being substantially free of lithium.

6. A process for the production of a precision press-molding preform, which comprises separating a glass gob from a flowing molten glass and shaping a preform formed of a glass during the cooling of the glass, wherein said glass is the optical glass recited in claim 1.

7. An optical element formed of the optical glass recited in claim 1.

8. A process for the production of an optical element, which comprises heating a precision press-molding formed of a glass and precision press-molding the preform with a press mold, wherein the preform recited in any one of claim 3 or 5 is used.

9. The process for the production of an optical element as recited in claim 8, wherein the precision press-molding is followed by oxidation of a carbon-containing film remaining on the surface of a precision press-molded product to remove the film.

10. The optical glass of claim 1, which satisfies the expression of vd>−125×nd+268.75.

11. The optical glass of claim 1, which contains, by mol %, 22 to 58% of $B_2O_3$, 0 to 18% of $SiO_2$, 23 to 41% of ZnO, 6 to 23% of $La_2O_3$, 1 to 19% of $Gd_2O_3$, 0 to 8% of $ZrO_2$, 0 to 8% of $Ta_2O_5$, 0 to 8% of $WO_3$, 0 to 8% of $Nb_2O_5$, 0 to 10% of $TiO_2$, 0 to 6% of $Bi_2O_3$, 0 to 8% of $GeO_2$, 0 to 8% of $Ga_2O_3$, 0 to 8% of $Al_2O_3$, 0 to 8% of BaO, 0 to 8% of $Y_2O_3$ and 0 to 8% of $Yb_2O_3$.

12. The optical glass of claim 1, which has an $La_2O_3$ and $Gd_2O_3$ total content of 12 to 23 mol %.

13. The optical glass of claim 1, which has an $La_2O_3$, $Gd_2O_3$, $Y_2O_3$ and $Yb_2O_3$ total content of 10 to 24 mol %.

14. The optical glass of claim 1, which contains 24 to 56 mol % of $B_2O_3$.

15. The optical glass of claim 1, which contains 0 to 8 mol % of $TiO_2$.

16. The optical glass of claim 1, which has a glass transition temperature of 630° C. or lower.

17. The optical glass of claim 1, which has a refractive index (nd) of 1.8172 or more.

* * * * *